Nov. 10, 1936.    L. C. MARTIN    2,060,094
OPHTHALMIC MOUNTING
Filed Feb. 1, 1936

Inventor:
Laurence C. Martin
By Pennington and White
Attorneys.

Patented Nov. 10, 1936

2,060,094

UNITED STATES PATENT OFFICE 2,060,094

OPHTHALMIC MOUNTING

Laurence C. Martin, Providence, R. I., assignor to Martin-Copeland Company, Providence, R. I.; Edgar W. Martin, E. Cornell Martin, Laurence C. Martin, and George W. Bleecker, trustees Application February 1, 1936, Serial No. 61,948

6 Claims. (Cl. 88—53)

This application is a continuation in part of my copending application Serial No. 737,221, filed July 27, 1934.

The present invention relates to ophthalmic mountings and particularly to improvements in the means illustrated and described in my above mentioned prior application for securing the lenses in the split rims of spectacles and for connecting the temples therewith.

One of the objects of the present invention is to provide an ophthalmic mounting of the type indicated in which the shim, shown in the prior application, engages the top of the temple over a considerable bearing area and remotely from the axis of the pivot-screw to firmly hold the temple in its proper position on the spectacle frame and to prevent "drop temple" caused by loosening of the joint during use of the spectacles.

Another object of the invention is to provide a shim having a boss offset from the plane of its bearing portion which stiffens this part engaged by the pivot-screw to thereby prevent deformation or a permanent set in the bearing surface of the shim which would render the joint loose and shackly.

Another object of the present invention is to provide an ophthalmic mounting of the type indicated in which the shim and one of the end-pieces on the split frame of the spectacles are permanently connected and formed to provide a slot-like opening therebetween to receive the end of the temple whereby the shim is prevented from being displaced when the split frame is separated for purposes of repair or replacement of parts.

Further objects of the improvements are set forth in the following specification which describes a preferred embodiment of the invention, by way of example, as illustrated by the accompanying drawing. In the drawing.

Figure 1:
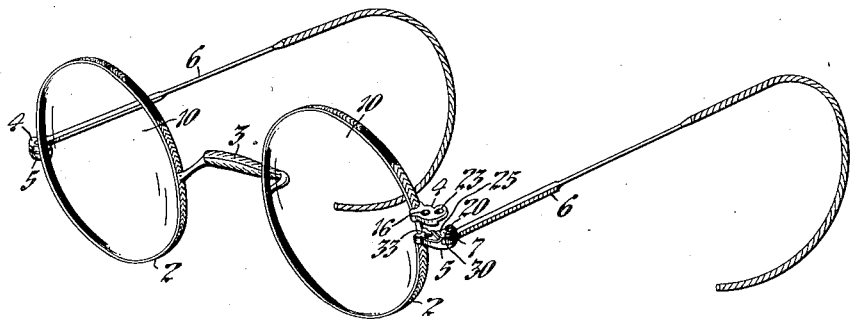
Fig. 1 is a perspective view of a pair of spectacles showing the present improved rim-securing device and temple-mounting means applied thereto with one of the split rims shown as sprung apart while the temple remains attached thereto.
Figures 3, 4:
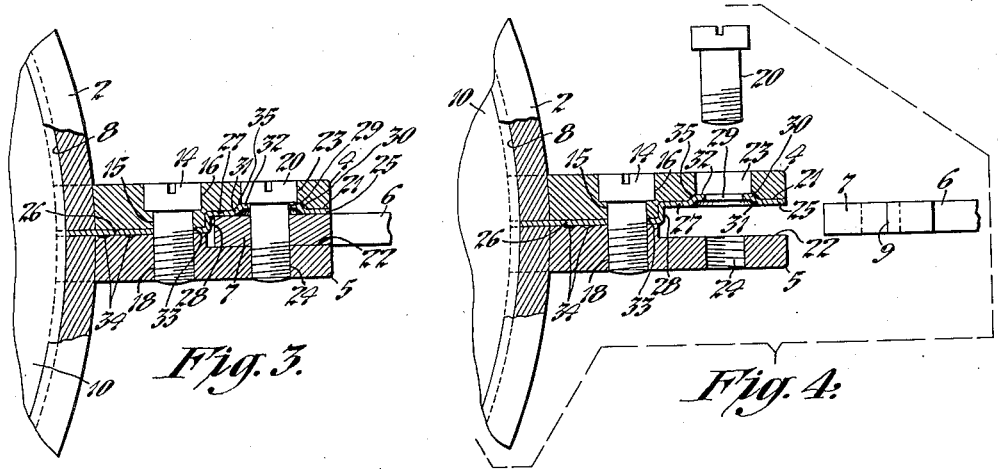
Fig. 3 is a sectional view on line 3—3 of Fig. 2 looking in the general direction indicated by the arrows and showing the offset boss on the shim which forms an annular bearing surface engaging the temple remotely from the axis of the pivot-screw.
Fig. 4 is a similar sectional view showing the temple removed from its mounting and its pivot-screw withdrawn.

In the drawing, Fig. 1 illustrates a spectacle frame of conventional type comprising split rims 2 joined by a bridge member 3 and formed with mountings at the sides for pivotally connecting the temples thereto. The rims 2 of the spectacle frame may be of generally circular or oval shape and, as shown in Figs. 3 and 4, the inner face of each rim is scored with a narrow groove 8 for receiving the peripheral edge of the lens 10. As in the usual construction the terminal portions of the divided rim 2 are provided with end-pieces 4 and 5 adapted to be drawn together by screws, rivets or other means to secure the rim in close fitting engagement with the periphery of the lens.

In a common form of construction of spectacle frames a screw is employed for drawing the ends of the rim together and a pin fast in one of the end-pieces serves as a pivot for the temple connection. With this form of construction the two end-pieces on the rim are maintained tight against the pivoted end of the temple by the screw which draws the ends of the rim together, but if the screw loosens, as often occurs from wearing and handling the spectacles, then the temple becomes loose and causes what is known as "drop temple" allowing the spectacles to tilt on the nose to thus throw the lenses out of proper axial adjustment. Moreover, with this previously used form of construction of the rim-securing means and temple mounting, when it becomes necessary to replace a broken temple with a new one the end-pieces of the lens rim must be separated, thus releasing the lens. After the broken temple has been replaced by a new one the lens must be refitted to the rim and unless extreme care is taken it may be set in the wrong position to interfere with the vision of the wearer.

In other cases, should the lens vary in diameter its proper fitting to the rim cannot always be accomplished; for example, should the lens be of less than the prescribed diameter it will be loose in the rim when the end-pieces of the latter are drawn together; while on the other hand, should it be too large for the rim the end-pieces cannot be drawn snugly into place and therefore the temple connection will be loose and shackly causing "drop temple".

To overcome the above-noted defects and deficiencies of previously used ophthalmic mountings for spectacles the present invention provides a construction wherein the fastening means for the ends of the lens rim is entirely separate from and independent of the pivot mounting for the temple. Through this improvement the rims of the spectacles may be properly adjusted to the lenses to compensate for slight variations in the diameter of the latter without affecting the snug fit of the temple within its mounting. Moreover, the independent means for respectively fastening the ends of the split rim and connecting the temple with its mounting provide for releasing the securing means for the rim to allow it to be sprung open to remove the lens without causing disconnection of the temple from its mounting; and vice versa, the temple may be removed from its mounting without disconnecting the ends of the rim so as not to disturb the mounting of the lens therein.

Figures 2, 5:
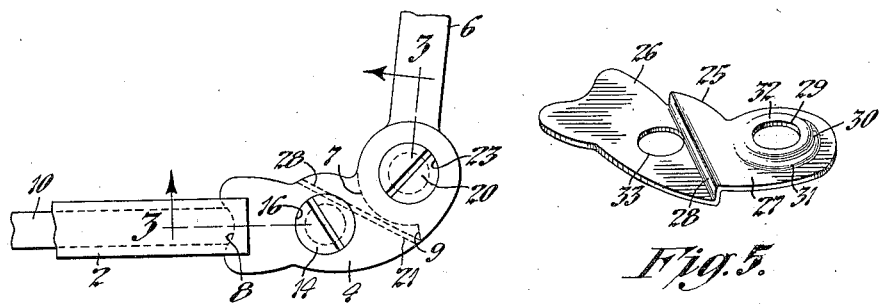
Fig. 2 is an enlarged plan view showing the general form of construction of the rim-securing means and temple mounting.
Fig. 5 is an enlarged perspective view of the shim showing its improved structural features in detail.

The above stated features of improvement are secured by constructing the end-pieces for the lens rim in a peculiar and novel manner as next described. Both end-pieces 4 and 5 are preferably of the same general shape, see Figs. 2 and 3, being disposed to extend laterally from the ends of the lens rim 2 with a generally curved marginal contour terminating in a circular end. The upper end-piece 4 is adapted to overlie the lower end-piece 5 to be secured thereto by means of a screw 14. The screw 14 passes through a hole 15 in the upper end-piece 4, with a counterbore provided at 16 to receive the head of the screw whereby its top will be flush with the top of the end-piece; and the lower end-piece 5 has an axially alined hole 18 interiorly threaded to engage the threads on the screw.

Outwardly beyond the holes for the screw 14 the two end-pieces 4 and 5 are provided with axially alined holes for another screw 20 which serves as the pivot for the temple 6. The upper end-piece 4 has a hole 23 which is of sufficient diameter to permit the head of the screw 20 to pass freely therethrough, while the lower end-piece 5 is provided with an axially alining hole 24 threaded to receive the threads of the screw 20. The underside of the upper end-piece 4 is milled off or cut away at 21 and the lower end-piece 5 is similarly cut away on its upper side at 22 whereby to provide a space for the insertion of the end of the temple 6 between the two end-pieces in the fashion of a hinge. It will be noted that the cut-out portions of the two end-pieces 4 and 5 are biased or, in other words, the sides of the cuts extend at an angle as shown by the dotted line in Fig. 2. The end of the temple 6 has a head 7 of generally circular shape conforming to the circular ends of the end-pieces 4 and 5 with a shoulder or projection 9 at one side positioned to strike against the edge of the cut to limit the turning movement of the temple on its pivot.

As thus far described the ophthalmic mounting is generally similar to that illustrated and described in my prior copending application referred to above. In this prior form of mounting a flat thin plate or shim is provided which is an improvement of considerable merit over previously used mountings and prevents "drop temple" to a high degree. It has been found, however, that when an unattached shim is used it is apt to become displaced while the rim is sprung open for adjustment or replacement of the parts. Further, it has been found that only the portion of the shim directly engaged by the head of the pivot-screw bears against the top of the temple end. Still further, due to the relatively thin material of the shim the portion engaged by the head of the screw is apt to become slightly concaved after extended use and is sometimes given a permanent set which prevents the laterally-extending portions of the shim from bearing securely against the temple. As a result, after long use there is a tendency for "drop temple" to appear due to the limited bearing surface of the shim on the temple end and the relatively long temple which acts as a lever.

In accordance with the present invention a novel and improved form of plate or shim 25 is provided which is less apt to be deformed in use and which bears against the pivoted end of the temple over an extended area remote from the axis of the pivot-screw 20. The shim 25, shown in perspective view in Fig. 5, has a marginal outline corresponding to the marginal contour of the end-pieces 4 and 5 and is offset or folded intermediate its ends to provide laterally-extending inward and outward portions 26 and 27 in two separate planes with a right-angular shoulder 28 therebetween. The outward portion 27 is provided with a hole 29 and the material around the hole is deformed by offsetting it upwardly with a suitable tool to form a boss 30. The boss 30 is of generally conical shape having a relatively wide base 31 at the bottom and a flat seat 32 on the top of the shim. The opposite portion 26 of the shim 25 is also provided with a hole 33 and is so placed on the upper face of the end-piece 5 that the hole alines with the hole 18 therein and the shoulder 28 alines with the shoulder formed by the cut-away portion 22 and extends upwardly therefrom. The inward portion 26 of the shim 25 is fixedly secured to the end-piece 5 by spot welding, indicated at 34, or by any other suitable means such as brazing, soldering or the like. The shim 25 then underlies and closely fits the stepped parallel faces on the upper end-piece 4, the hole 23 being countersunk at 35 to receive the boss 30 on the shim.

It is to be particularly noted that the outer hole 29 in the shim 25 is alined with the holes 23 and 24 in the end-pieces 4 and 5 and that the diameter of the hole in the shim is substantially equal to that of the shank of the screw 20 or, in other words, of somewhat less diameter than the head of the screw. This provides that when the screw 20 is inserted in place and screwed down into the threaded hole 24 in the lower end-piece 5 the under side of its head will abut against the seat 32 on the boss 30 to tighten the shim 25 against the upper face of the temple end 7. Due to the relatively wide base 31, resulting from the conical form of the boss 30, the shim 25 provides an annular bearing surface which engages the temple remotely from the axis of the screw. Further, due to the struck-up offset boss 30 the outward end portion 27 of the shim 25 is materially stiffened which prevents deformation of the shim whereby its original annular bearing surface is preserved after long periods of use.

The parts of the spectacle frame may be assembled for marketing without the lenses in the manner as next explained, or in any way found most convenient. For example, the temple end 7 may be placed in the slot-like opening between the lower end-piece 5 and the outward portion 27 of the shim 25 and the screw 20 inserted through the hole 29 and the temple bearing 7 and screwed down into the threaded hole 24 in the end-piece 5. The head of the screw 20 is set up against the seat 32 on the boss 30 to tighten the shim 25 against the top of the bearing 7 of the temple 6 to prevent play or looseness in the joint. The two ends of the split rim 2 are then sprung together and the end-pieces 4 and 5 joined by inserting the screw 14 and screwing it down into the threaded hole 18 in the lower end-piece 5. As the two end-pieces 4 and 5 are placed in juxtaposition the head of the screw 20 will enter the hole 23 in the upper end-piece 4 and when the screw 14 is tightened in place its head will be enclosed in the hole 16 of the upper end-piece. In this way a smooth, flush joint is effected with no projections or sharp corners liable to scratch the face or injure the hands of the wearer.

In fitting the lenses to the spectacles the screws 14 are loosened or removed and the rims 2 sprung apart for insertion of the peripheral edges of the lenses within the grooves 8 of the rims. The ends of the rims may then be sprung together and the end-pieces 4 and 5 secured in juxtaposition by the screws 14. It is thus possible to tighten the rims against the edges of the lenses with the required tension without in any way affecting the joint of the temple 6 with its mounting. That is to say, the screw 20 remains set up against the shim 25 to hold the temple bearing 7 snugly against the lower end-piece 5. Due to the provision of the boss 30 the shims 25 functions in the nature of a dished washer which bears against the bearing 7 of the temple 6 over a considerable area remote from the axis of the screw 20 and prevents the screw 20 from becoming loosened or unscrewed by repeated swiveling of the temple in its mounting. Should the temple screw 20 become loosened from abuse or after long use it may be readily tightened without in any way disturbing the adjustment of the rim on the lens, the end-piece connection being held fast by the screw 14. Further, due to the upset form of the boss 30 the end portion 27 is materially stiffened so that the annular bearing surface of the shim is more resistant to deformation to prevent "drop temple".

It is also to be noted that it is unnecessary that the two end-pieces 4 and 5 be drawn together into close abutting relationship or with the upper end-piece 4 in contact with the shim 25, as the latter is rigidly fixed to the lower end-piece 5. While it is preferable that the parts be thus closely connected, if the lens should be of slightly greater diameter than intended the rim can be tightened thereon with the proper tension without entirely closing the joint between the end-pieces, thereby avoiding the danger of cracking or breaking the glass. On the other hand, should the lens have a diameter less than prescribed the upper end-piece may be filed off on its under side to provide for proper tightening of the rim when the screw 14 is screwed down into the lower end-piece 5.

It has been stated that the lenses can be fitted to the rims of the spectacles without disturbing the mountings for the temples 6 and, likewise, the temples may be removed to be replaced by others without dislocating the joints at the ends of the rims 2 to disturb the lens mounting. All that is necessary for this purpose is to remove the screws 20 whereby the temples 6 will be released from connection with the end-pieces 5.

It will be observed from the foregoing that the present invention provides a particularly simple yet efficient device for attaching the rims of the spectacle frames to the lenses and for hingedly connecting the temples to provide for their removal without disturbing the lens mounting. The improved device also provides for greater convenience in fitting the lenses to the spectacles while insuring a secure connection therebetween. The defect of "drop temple" is obviated by the boss on the outward portion of the shim which provides an annular bearing seat for engaging the pivoted end of the temple remotely from the axis of the pivot-screw. Also, due to the stiffening effect of the boss, the annular bearing surface on the shim is less apt to become deformed to permit a loose or shackly joint.

As another advantage, the present mounting is adapted to take standard types and sizes of temples without alteration therein, slight variations in the thickness of the temple head or bearing end due to tolerances in manufacture being compensated for by the flexibility of the shim 25.

In addition, the present improved device is capable of being manufactured at low cost, presents a neat and finished appearance and is efficient and durable in use over long periods.

While the invention is herein shown and described as embodied in a preferred form of construction, various modifications may be made in the structure and arrangement of its parts without departing from the spirit or scope of the invention. Therefore, without limiting myself in this respect, I claim:

1. An ophthalmic mounting for spectacle frames, comprising end-pieces on the split rims of the frame, a shim overlying one of the end-pieces on the split rim and having a boss offset with respect to the plane of its main portion with a hole located centrally of the boss, said end-piece and overlying shim being formed to provide a slot-like opening therebetween, a temple having an end lying wholly between the shim and opposite end-piece, and a screw having its head engaging the boss on the shim and its shank passing through the central hole therein and through the temple and screwed into the opposite end-piece to seat the bottom of the shim against the top of the temple end whereby the latter is engaged by an annular bearing area on the shim remote from the axis of the screw.

2. An ophthalmic mounting for spectacle frames comprising end-pieces on the split rims of the frame, one of said end-pieces having stepped parallel faces, a shim located between the end-pieces overlying the outer stepped face of one of the end-pieces in spaced relation thereto to provide a slot-like opening therebetween, said shim having a boss offset with respect to the plane of its main portion and a hole located centrally of the boss, a temple having an end in the slot-like opening, and a screw having its head engaging the boss on the shim with its shank passing through the central hole and temple end and screwed into the opposite end-piece to draw the bottom of the shim into engagement with the top of the temple, said shim engaging the temple over a considerable area remote from the axis of the screw due to the offset boss.

3. An ophthalmic mounting for spectacle frames comprising end-pieces on the split rims of the frame disposed in overlying relationship, said end-pieces being formed to provide a slot-like opening therebetween to receive the end of a temple, a shim disposed between the end-pieces to overlie the top of the temple, said shim having a bearing boss offset from the plane of its main portion with a centrally-positioned hole therein, and said end-piece adjacent the shim having a larger hole surrounding the hole in the shim, a screw passing through one end-piece and the shim and screwed into the opposite end-piece to draw the ends of the rim together, and a second screw passing through the hole in the shim and screwed into the end-piece opposite the shim, the head of the second screw passing through the hole in the end-piece and engaging the offset boss on the shim to seat the latter against the top of the temple end whereby the latter is engaged by an annular bearing surface on the shim remote from the axis of the screw.

4. An ophthalmic mounting for spectacle frames comprising end-pieces on the split rim of the frame, one of said end-pieces having stepped parallel faces, a shim of relatively thin material having laterally-extending end-portions offset in different planes, one of said end-portions of the shim being fixedly secured to one of the stepped faces on the end member with the opposite offset portion overlying the other stepped face in spaced relation thereto to provide a slot-like opening therebetween, said overlying portion of the shim having a boss offset with respect to the plane of its end portion and a hole positioned centrally of the boss, a temple having its end in the slot-like opening, and a screw having its head engaging the boss and its shank passing through the central hole therein and the end of the temple and screwed into the opposite end-piece to seat the bottom of the shim against the top of the temple, said boss on the shim providing an annular bearing face engaging the top of the temple end remotely from the axis of the screw.

5. In an ophthalmic mounting for spectacles, the combination with a split rim of a spectacle frame, of end-pieces thereon for connecting the ends of the rim, each of said end-pieces having stepped parallel faces offset in parallel planes to provide a slot-like opening therebetween, a shim having laterally-extending end portions offset in different planes for abutting engagement with the parallel stepped faces of one of the end-pieces, said shim having an annular boss offset from the plane of its end portion with a central hole therein, a temple having an end lying wholly between the shim and opposite end-piece, a screw passing through one end-piece and the shim and screwed into the opposite end-piece to draw the ends of the rim together, and a second screw extending through the hole in the shim and a hole in the end of the temple and screwed into the opposite end-piece to pivotally connect the temple therewith, the end-piece abutting the shim being provided with an opening to permit the head of the screw to directly engage the boss on the shim to seat the latter against the top of the temple end, and said boss on the shim providing an annular bearing surface engaging the top of the temple remotely from the axis of the screw.

6. In an ophthalmic mounting for spectacles, the combination with the split rim of a spectacle frame, of end-pieces thereon for connecting the ends of the rim, each of said end-pieces having stepped parallel faces offset in different planes to provide a slot-like opening, a shim having laterally-extending end-portions offset in different planes for cooperation with the parallel stepped faces of one of the end-pieces, one of the end-portions of said shims being fixedly secured to one of the end-pieces and the opposite end-portion having an annular boss offset from the plane of said end-portion with a central hole therein, said end-piece engaged by the shim having a countersunk hole for receiving the offset boss, a temple having an end lying between the shim and opposite end-piece, means for drawing the end-pieces together, and a screw having its head in the countersunk hole in the end-piece engaging the boss on the shim with its shank extending through the hole in the shim and through the temple and screwed into the opposite end-piece, said boss on the shim providing an annular bearing surface engaging the top of the temple end over a relativey wide area.

LAURENCE C. MARTIN.